United States Patent
Gupta et al.

(10) Patent No.: US 9,772,908 B1
(45) Date of Patent: Sep. 26, 2017

(54) METHOD AND SYSTEM FOR CONCURRENTLY BACKING UP DATA STREAMS OF MULTIPLE COMPUTERS BASED ON BACKUP TIME ESTIMATES

(71) Applicant: EMC Corporation, Hopkinton, MA (US)

(72) Inventors: Rajendra Kumar Gupta, Bangalore (IN); Vladimir Mandic, San Jose, CA (US); Anupam Sharma, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 212 days.

(21) Appl. No.: 14/097,826

(22) Filed: Dec. 5, 2013

(51) Int. Cl.
*G06F 17/30* (2006.01)
*G06F 11/14* (2006.01)

(52) U.S. Cl.
CPC ................ *G06F 11/1461* (2013.01)

(58) Field of Classification Search
CPC .. G06F 11/1461; G06F 11/1464; G06F 11/34; G06F 3/0631; G06F 3/067; H04L 67/1095; H04L 67/1097; H04L 67/322
USPC ........................ 707/654; 711/162; 718/102
See application file for complete search history.

(56) References Cited

U.S. PATENT DOCUMENTS

| | | | | |
|---|---|---|---|---|
| 5,854,754 A * | 12/1998 | Cabrera | ................ | G06F 9/5066 703/2 |
| 7,127,535 B1 * | 10/2006 | Huebsch | ............ | G06F 11/1464 709/203 |
| 2004/0205206 A1 * | 10/2004 | Naik | ....................... | H04L 29/06 709/230 |
| 2005/0132257 A1 * | 6/2005 | Gold | ................... | G06F 11/3495 714/47.2 |
| 2007/0288530 A1 * | 12/2007 | Romem | .............. | G06F 11/1471 |
| 2008/0016300 A1 * | 1/2008 | Yim | .................... | G06F 11/2064 711/162 |
| 2009/0100195 A1 * | 4/2009 | Barsness | ............. | G06F 11/1464 709/247 |
| 2009/0172322 A1 * | 7/2009 | Gilpin | ................. | G06F 11/1456 711/162 |
| 2009/0300633 A1 * | 12/2009 | Altrichter | ............. | G06F 9/4856 718/103 |
| 2012/0131583 A1 * | 5/2012 | Cherkasova | ........ | G06F 11/1461 718/102 |
| 2014/0040573 A1 * | 2/2014 | Cherkasova | ........ | G06F 11/1461 711/162 |

* cited by examiner

*Primary Examiner* — Dennis Truong
(74) *Attorney, Agent, or Firm* — Dergosits & Noah LLP; Todd A. Noah

(57) ABSTRACT

Concurrently backing up data streams of multiple computers based on backup time estimates is described. A system queries multiple computers to identify multiple data streams scheduled for backup. The system queries the multiple computers to identify multiple backup time estimates corresponding to the multiple data streams. The system creates a ranked relational sequence based on the multiple backup time estimates. The system instructs the multiple computers to provide the multiple data streams based on the ranked relational sequence. The system concurrently backs up the multiple data streams based on a concurrency limit and the ranked relational sequence.

17 Claims, 4 Drawing Sheets

| | Time Period 1 | Time Period 2 | 300<br>Time Period 3 | Time Period 4 | Time Period 5 | Time Period 6 |
|---|---|---|---|---|---|---|
| Data Stream A | Start Backup A | Continue Backup A | Continue Backup A | Finish Backup A | | |
| Data Stream B | Start Backup B | Finish Backup B | | | | |
| Data Stream C | | | Backup C | | | |
| Data Stream D | | | | Start Backup D | Continue Backup D | Finish Backup D |
| | | | | | | |

FIG. 3

| | Time Period 1 | Time Period 2 | 400<br>Time Period 3 | Time Period 4 | Time Period 5 | Time Period 6 |
|---|---|---|---|---|---|---|
| Data Stream A | Start Backup A | Continue Backup A | Continue Backup A | Finish Backup A | | |
| Data Stream D | Start Backup D | Continue Backup D | Finish Backup D | | | |
| Data Stream B | | | | Start Backup B | Finish Backup B | |
| Data Stream C | | | | | Backup C | |
| | | | | | | |

FIG. 4

METHOD AND SYSTEM FOR CONCURRENTLY BACKING UP DATA STREAMS OF MULTIPLE COMPUTERS BASED ON BACKUP TIME ESTIMATES

BACKGROUND

If a software error corrupts a data object, or if erroneous data updates the data object, a data protection administrator may restore the data object to a previous uncorrupted state that does not include the corrupted or erroneous data. A backup application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup application to execute a restore operation to restore a copy of the corresponding backup files for that state to the data object.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 3 illustrates a block diagram of an example timeline for concurrently backing up data streams of multiple computers in the prior art;

FIG. 4 illustrates a block diagram of an example timeline for concurrently backing up data streams of multiple computers based on backup time estimates, under an embodiment.

DETAILED DESCRIPTION

Figure 1:
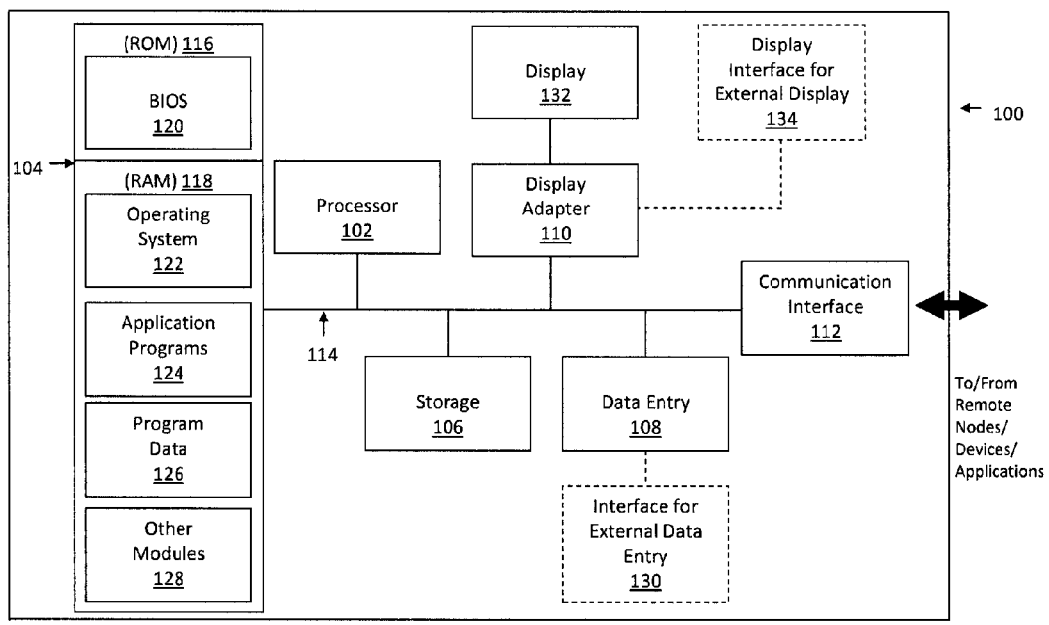
FIG. 1 is a block diagram illustrating an example hardware device in which the subject matter may be implemented.

A backup application for a distributed system may backup copies of states for multiple data objects, such as multiple databases, for multiple computers executing in the distributed system. The size of the data streams backed up for each corresponding data object may vary randomly, as the size of a data stream may be based on the size of the corresponding data object and/or the amount of changes made to the corresponding data object since the last backup. A backup application's resource capacity may limit the number of data streams that can be backed up concurrently. When a prior art backup application backs up data streams for multiple computers in a distributed system, the multiple computers may queue the data streams to the backup application in a random way, which makes the process of backing up data streams inefficient and increases the amount of time required for backing up the data objects.

Embodiments herein provide concurrently backing up data streams of multiple computers based on backup time estimates. A system queries multiple computers to identify multiple data streams scheduled for backup. For example, a backup optimizer queries a first server, which identifies a database A and a database B as scheduled for backup at midnight, and queries a second server, which identifies a database C and a database D as scheduled for backup at midnight. The system queries the multiple computers to identify multiple backup time estimates corresponding to the multiple data streams. For example, a backup optimizer queries the first server, which identifies a 400 gigabyte data stream for the database A and a 200 gigabyte data stream for the database B, and queries the second server, which identifies a 100 gigabyte data stream for the database C and a 300 gigabyte data stream for the database D.

The system creates a ranked relational sequence based on the multiple backup time estimates. For example, the backup optimizer creates a ranked relational sequence of the 400 gigabyte data stream for the database A, the 300 gigabyte data stream for the database D, the 200 gigabyte data stream for the database B, and the 100 gigabyte data stream for the database C. The system instructs the multiple computers to provide the multiple data streams based on the ranked relational sequence. For example, the backup optimizer instructs the first server to provide the 400 gigabyte data stream for the database A first in the sequence of data streams, the second server to provide the 300 gigabyte data stream for the database D second in the sequence of data streams, the first server to provide the 200 gigabyte data stream for the database B third in the sequence of data streams, and the second server to provide the 100 gigabyte data stream for the database C fourth in the sequence of data streams.

The system concurrently backs up the multiple data streams based on a concurrency limit and the ranked relational sequence. For example, the backup application begins backing up the 400 gigabyte data stream for the database A and the 300 gigabyte data stream for the database D because the system has a backup concurrency limit of two data streams. The backup application begins with the data streams for the databases A and D because the backup application received the 400 gigabyte data stream for the database A first in the sequence of data streams and received the 300 gigabyte data stream for the database D second in the sequence of data streams. When the backup application finishes backing up the 300 gigabyte data stream for the database D, the backup application begins backing up the 200 gigabyte data stream for the database B because the backup application received the 200 gigabyte data stream for the database B third in the sequence of data streams. When the backup application finishes backing up the 400 gigabyte data stream for the database A, the backup application begins backing up the 100 gigabyte data stream for the database C because the backup application received the 100 gigabyte data stream for the database C fourth in the sequence of data streams.

By enabling the concurrent backing up of data streams of multiple computers based on backup time estimates, the backup optimizer reduces the total amount of time required to back up the data streams. As is described below, the backup optimizer reduces the total amount of time required to back up the data streams by 16.6% in this example.

Prior to describing the subject matter in detail, an exemplary hardware device in which the subject matter may be implemented shall first be described. Those of ordinary skill in the art will appreciate that the elements illustrated in FIG.

1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods concurrently backing up data streams of multiple computers based on backup time estimates.

When a prior art backup application backs up data streams of multiple computers, the multiple computers may queue the data streams to the backup application in a random way, which makes the process of backing up data streams inefficient and increases the amount of time required for backing up the databases. Embodiments herein enable concurrently backing up of data streams of multiple computers based on backup time estimates. By enabling the concurrent backing up of data streams of multiple computers based on backup time estimates, a backup optimizer reduces the total amount of time required for backing up data streams.

Figure 2:
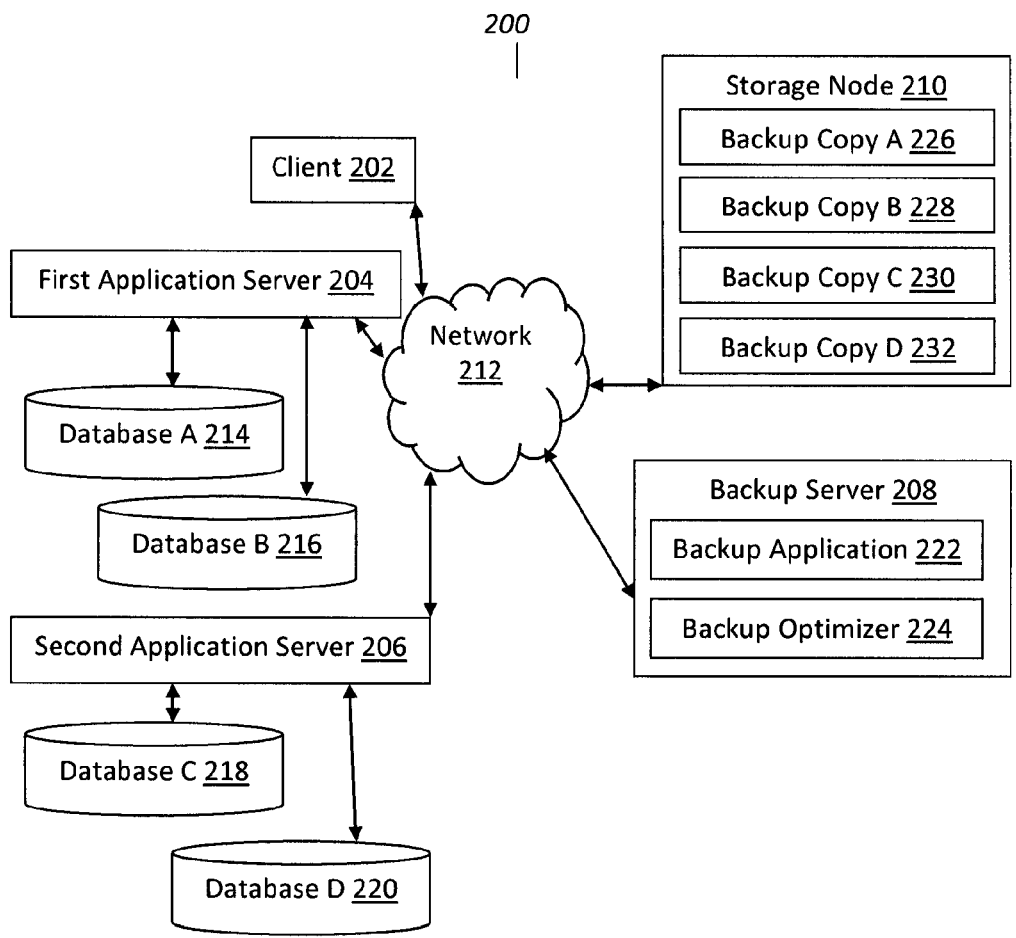
FIG. 2 illustrates a block diagram of an example system for concurrently backing up data streams of multiple computers based on backup time estimates, under an embodiment.

FIG. 2 illustrates a block diagram of a system that implements concurrently backing up of data streams of multiple computers based on backup time estimates, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202; and a first application server 204, a second application server 206, a backup server 208, and a storage node 210 that may be provided by a hosting company. The client 202, the servers 204-208, and the storage node 210 communicate via a network 212. Although FIG. 2 depicts the system 200 with one client 202, three servers 204-208, one storage node 210, and one network 212, the system 200 may include any number of clients 202, servers 204-208, storage nodes 210, and networks 212. The client 202 and the servers 204-208 may each be substantially similar to the system 100 depicted in FIG. 1.

The first application server 204 accesses a database A 214 and a database B 216, while the second application server 206 accesses a database C 218 and a database D 220. The backup server 208 includes a backup application 222 and a backup optimizer 224, while the storage node 210 includes a backup copy A 226, a backup copy B 228, a backup copy C 230, and a backup copy D 232. FIG. 2 depicts the system elements 222-224 residing completely on the backup server 208 with the system elements 226-232 residing completely on the storage node 210. However, the system elements 222-224 may reside completely on any of the servers 204-208, completely on the client 202, completely on another server that is not depicted in FIG. 2, or in any combination of partially on any of the servers 204-208, partially on the client 202, and partially on the other server. Similarly, the system elements 226-232 may reside completely on the storage node 210, completely on another storage node that is not depicted in FIG. 2, or in any combination of partially on the storage node 210 and partially on the other storage node.

The backup application 222 may be an EMC Corporation's NetWorker® backup application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The system 200 queries multiple computers to identify multiple data streams scheduled for backup. For example, the backup optimizer 224 queries the first application server 204, which identifies the database A 214 and the database B 216 as scheduled for backup at midnight, and queries the second server 206, which identifies the database C 218 and the database D 220 as scheduled for backup at midnight. Although this example describes data stream corresponding to databases, the data streams may correspond to any data objects, such as operating systems, application programs, disk drives, directories, files.

The system 200 queries multiple computers to identify multiple backup time estimates corresponding to multiple data streams. For example, the backup optimizer 224 queries the first application server 204, which identifies a 400 gigabyte data stream A for the database A 214 and a 200 gigabyte data stream B for the database B 216, and queries the second application server 206, which identifies a 100 gigabyte data stream C for the database C 218 and a 300 gigabyte data stream D for the database D 220. This example describes the backup time estimates based on corresponding sizes of data streams because the amount of time required for backing up a data stream by transferring and storing the data stream may be proportional to the size of the data stream. Each of the servers 204-206 may identify the sizes of data streams by executing their operating system's application program interface.

The backup application 222 may be able to backup different data streams at different rates. For example, the second application server 206 may be able to transfer data streams at a faster rate than the first application server 204 can transfer data streams. Therefore, a system administrator may select additional methods for estimating backup times. Alternatively or additionally, the backup optimizer 224 may base the backup time estimates on corresponding historical backup times of data streams. For example, if the backup application 222 required four hours last night for backing up a 400 gigabyte data stream A for the database A 214, then the backup optimizer 224 estimates the time required for backing up a 400 gigabyte data stream A for the database A 214 at four hours for tonight. The historical backup times of data streams may be normalized based on corresponding historical sizes of data streams relative to corresponding current sizes of data streams. For example, if the backup application 222 required four hours last night for backing up a 400 gigabyte data stream A for the database A 214, then the backup optimizer 224 estimates the time required for backing up a 200 gigabyte data stream A for the database A 214 at two hours for tonight.

The system 200 creates a ranked relational sequence based on multiple backup time estimates. For example, the backup optimizer 224 creates a ranked relational sequence of the 400 gigabyte data stream A for the database A 214, the 300 gigabyte data stream D for the database D 220, the 200 gigabyte data stream B for the database B 216, and the 100 gigabyte data stream C for the database C 218. This example describes the ranked relational sequence as based on a decreasing order from a longest time estimate to a shortest time estimate, but the ranked relational sequence may be based on an increasing order from a shortest time estimate to a longest time estimate. For example, the backup optimizer 224 may create a ranked relational sequence of the 100 gigabyte data stream C for the database C 218. the 200 gigabyte data stream B for the database B 216, the 300 gigabyte data stream D for the database D 220, and the 400 gigabyte data stream A for the database A 214. Although the backup optimizer 224 may somewhat optimize the backing up of data streams with the ranked relational sequence based on an increasing order, the backup optimizer 224 may significantly optimize the backing up of data streams with the ranked relational sequence based on a decreasing order. A system administrator may determine whether the ranked relational sequence is based on an increasing order or a decreasing order.

The system 200 instructs multiple computers to provide multiple data streams based on a ranked relational sequence. For example, the backup optimizer 224 instructs the first application server 204 to provide the 400 gigabyte data stream A for the database A 214 first in the sequence of data streams, the second application server 206 to provide the 300 gigabyte data stream D for the database D 220 second in the sequence of data streams, the first application server 204 to provide the 200 gigabyte data stream B for the database B 216 third in the sequence of data streams, and the second application server 206 to provide the 100 gigabyte data stream C for the database C 218 fourth in the sequence of data streams. The backup optimizer 224 instructs the servers 204-206 to provide their data streams in an order that is optimized, in contrast to the prior art, in which the servers 204-206 to provide their data streams to the backup application 222 in a random order.

The system 200 concurrently backs up multiple data streams based on a concurrency limit and a ranked relational sequence. For example, the backup application 222 begins backing up the 400 gigabyte data stream A for the database A 214 and the 300 gigabyte data stream D for the database D 220 because the system 200, the backup server 208 and/or the backup application 222 has a backup concurrency limit of two data streams. The backup application 222 begins with the data streams for the databases A and D 214 and 220 because the backup application 222 received the 400 gigabyte data stream A for the database A 214 first in the sequence of data streams and received the 300 gigabyte data stream D for the database D 220 second in the sequence of data streams. When the backup application 222 finishes backing up the 300 gigabyte data stream D for the database D 220, the backup application 222 begins backing up the 200 gigabyte data stream B for the database B 216 because the backup application 222 received the 200 gigabyte data stream B for the database B 216 third in the sequence of data streams. When the backup application 222 finishes backing up the 400 gigabyte data stream A for the database A 214, the backup application 222 begins backing up the 100 gigabyte data stream C for the database C 218 because the backup application 222 received the 100 gigabyte data stream C for the database C 218 fourth in the sequence of data streams.

By enabling the concurrent backing up of data streams of multiple computers based on backup time estimates, the backup optimizer 224 reduces the amount of time required to back up the data streams. The descriptions below of FIG. 3 and FIG. 4 indicate that the backup optimizer 224 reduces the total amount of time required to back up the data streams by 16.6% in this example A data protection administrator may use the backup application 222 to specify a priority for storing the backup copies 226-232 on destination nodes, such as storing only on disks, or storing on disks before storing on a combination of disks and tapes. Additionally, a data protection administrator may use the backup application 222 to specify the options for data to be encrypted, deduplicated, and/or compressed while being transmitted from a source, and the options for data to be decrypted and/or decompressed when stored on a destination. Data deduplication significantly reduces backup time by only storing unique daily changes, while always maintaining daily full backups for immediate single-step restore. The transmission of deduplicated backup sends only changed blocks, thereby reducing network traffic.

A data protection administrator may use the backup application 222 to generate a specific policy based on the specific needs of a customer, and reuse that policy for customers with similar needs. For example, a data protection administrator may use the backup application 222 to generate a "gold" policy, a "platinum" policy, and a "silver" policy for VMware® clients. The gold policy can specify to store 2 backup copies for each VMware® client onto a first disk for 6 months, store a clone of the backup copies on a second disk for 1 year, and store a secondary clone of the backup copies on a tape for 5 years. In this example, the data protection administrator that used the backup application 222 to generate the gold policy for a specific set of VMware® clients may later apply another instance of the same gold policy to a different set of VMware® clients. Similarly, the data protection administrator may apply another instance of the same platinum policy to a different set of VMware® clients.

The system 200 may subsequently restore data to a database. For example, the backup application 222 restores the backup copy A 226 to the database A 214.

FIG. 3 illustrates a block diagram of an example timeline for concurrently backing up data streams of multiple computers in the prior art. The timeline 300 depicts the time required for the backup application 222 to backup data streams of multiple computers in a non-optimized manner, without the backup optimizer 224, as a prior art backup application backs up data streams of multiple computers. The timeline 300 includes columns for time period 1, time period 2, time period 3, time period 4, time period 5, and time period 6; and includes rows for data stream A, data stream B, data stream C, and data stream D.

In this example, at the beginning of the time period 1 at midnight, the backup application 222 begins backing up the 400 gigabyte data stream A for the database A 214 and the 200 gigabyte data stream B for the database B 216 because the system 200, the backup server 208 and/or the backup application 222 has a backup concurrency limit of two data streams. The backup application 222 begins with the data streams A and B for the databases A and B 214-216 because the backup application 222 receives the data streams A and B from the first application server 204 before the backup application 222 receives the data streams C and D for the databases C and D 218-220 from the second application server 206. The order in which the backup application 222 receives data streams may be completely random, such that the next night at midnight the backup application 222 may receive the data streams C and D for the databases C and D 218-220 from the second application server 206 before receiving the data streams A and B for the databases A and B 214-216 from the first application server 204.

The backup application 222 needs four time periods for backing up the 400 gigabyte data stream A for the database A 214, needs two time periods for backing up the 200 gigabyte data stream B for the database B 216, needs one time period for backing up the 100 gigabyte data stream C for the database C 218, and needs three time periods for backing up the 300 gigabyte data stream D for the database D 220. The time periods may be any length of time, such as seconds, minutes, or hours, but in this example the time periods are described as hours. At the end of the time period 1 at one o'clock in the morning, the backup application 222 is still backing up the data streams for the databases A and B 214-216. At the end of the time period 2 at two o'clock in the morning, the backup application 222 is still backing up the data stream A for the database A 214, and has finished backing up the data stream B for the database B 216.

When the backup application 222 finishes backing up the 200 gigabyte data stream B for the database B 216, at the end of the time period 2 at two o'clock in the morning, the backup application 222 begins backing up the 100 gigabyte data stream C for the database C 218. The backup application 222 begins with the data stream C for the database C 218 because the backup application 222 received the data stream C before the backup application 222 received the data stream D for the database D 220. The order in which the backup application 222 receives data streams may be completely random, such that the next night at midnight the backup application 222 may receive the data stream D for the database D 202 before receiving the data stream C for the database C 218. At the end of the time period 3 at three o'clock in the morning, the backup application 222 is still backing up the data stream A for the database A 214, and has finished backing up the data stream C for the database C 218.

When the backup application 222 finishes backing up the 100 gigabyte data stream C for the database C 218, at the end of time period 3 at three o'clock in the morning, the backup application 222 begins backing up the 300 gigabyte data stream D for the database D 220 because data stream D is the only data stream left for the backup application 222 to backup. At the end of the time period 4 at four o'clock in the morning, the backup application 222 is still backing up the data stream D for the database D 220, and has finished backing up the data stream A for the database A 214. At the end of the time period 5 at five o'clock in the morning, the backup application 222 is still backing up the data stream D for the database D 220. At the end of the time period 6 at six o'clock in the morning, the backup application 222 has finished backing up the data stream D for the database D 220. The backup application 222 required six time periods, from midnight to six o'clock in the morning, to backup up the data streams A, B, C, and D, which the backup application 222 backs up in the same random order that the backup application 222 receives the data streams A, B, C, and D.

FIG. 4 illustrates a block diagram of an example timeline for concurrently backing up data streams of multiple computers based on backup time estimates, under an embodiment. Similar to the timeline 300, the timeline 400 includes columns for time period 1, time period 2, time period 3, time period 4, time period 5, and time period 6; and includes rows for data stream A, data stream B, data stream C, and data stream D. Similar to the example described in FIG. 3, the backup application 222 needs four time periods for backing up the 400 gigabyte data stream A for the database A 214, needs two time periods for backing up the 200 gigabyte data stream B for the database B 216, needs one time period for backing up the 100 gigabyte data stream C for the database C 218, and needs three time periods for backing up the 300 gigabyte data stream D for the database D 220. The time periods may be any length of time, such as seconds, minutes, or hours, but in this example the time periods are described as hours.

In this example, at the beginning of the time period 1 at midnight, the backup application 222 begins backing up the 400 gigabyte data stream A for the database A 214 and the 300 gigabyte data stream D for the database D 220 because the system 200, the backup server 208 and/or the backup application 222 has a backup concurrency limit of two data streams. The backup application 222 begins with the data streams for the databases A and D 214 and 220 because the backup application 222 received the 400 gigabyte data stream A for the database A 214 from the first application server 204 first in the sequence of data streams and received the 300 gigabyte data stream D for the database D 220 from the second application server 206 second in the sequence of data streams. At the end of the time period 1 at one o'clock in the morning, the backup application 222 is still backing up the data streams A and D for the databases A and D 214 and 220. At the end of the time period 2 at two o'clock in the morning, the backup application 222 is still backing up the data streams A and D for the databases A and D 214 and 220. At the end of the time period 3 at three o'clock in the morning, the backup application 222 is still backing up the data stream A for the database A 214, and has finished backing up the data stream D for the database D 220.

When the backup application 222 finishes backing up the 300 gigabyte data stream D for the database D 220, at the end of the time period 3 at three o'clock in the morning, the backup application 222 begins backing up the 200 gigabyte data stream B for the database B 216 because the backup application 222 received the 200 gigabyte data stream B for the database B 216 from the first application server 204 third in the sequence of data streams. At the end of the time period 4 at four o'clock in the morning, the backup application 222 is still backing up the data stream B for the database B 216, and has finished backing up the data stream A for the database A 214.

When the backup application 222 finishes backing up the 400 gigabyte data stream A for the database A 214, at the end of the time period 4 at four o'clock in the morning, the backup application 222 begins backing up the 100 gigabyte data stream for the database C 218 because the backup application 222 receives the 100 gigabyte data stream for the database C 218 from the second application server 206 fourth in the sequence of data streams. At the end of the time period 5 at five o'clock in the morning, the backup application 222 has finished backing up the data stream B for the database B 216 and has finished backing up the data stream C for the database C 218. In contrast to the prior art method described in FIG. 3, in which the backup application 222 required six time periods, from midnight to six o'clock in the morning, to backup up the data streams A, B, C, and D, the backup optimizer 224 reduces the amount of time required to back up the data streams A, D, C, and B to five time periods from midnight to six o'clock in the morning. For this example the backup optimizer 224 reduces the amount of time required to back up the data streams by 16.6%.

Figure 5:
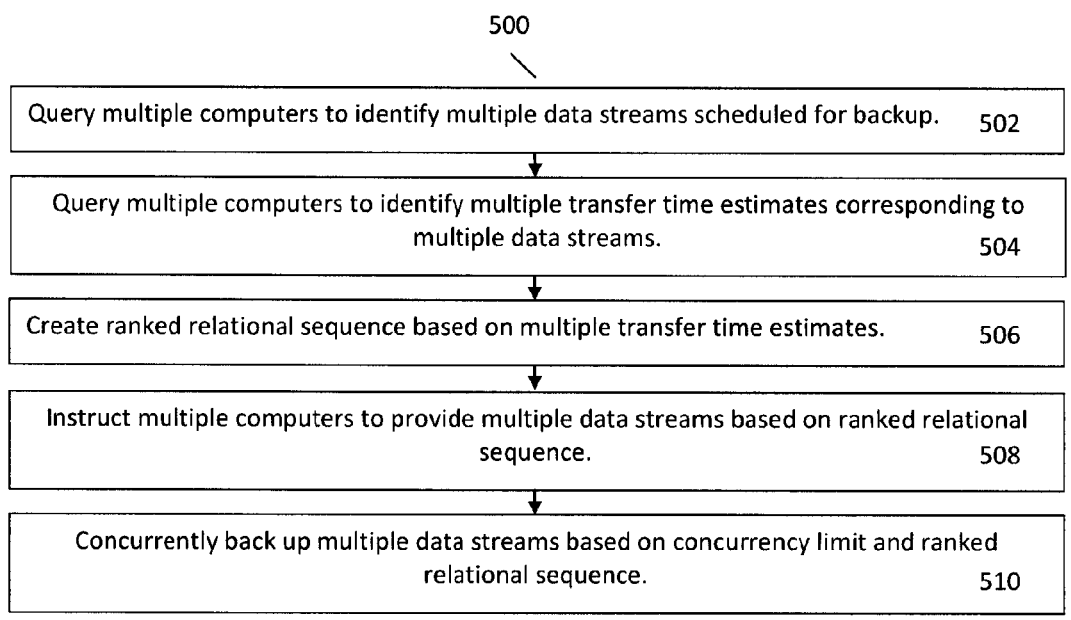
FIG. 5 is a flowchart that illustrates a method of concurrently backing up data streams of multiple computers based on backup time estimates, under an embodiment.

FIG. 5 is a flowchart that illustrates a method of concurrently backing up data streams of multiple computers based on backup time estimates. Flowchart 500 illustrates method acts illustrated as flowchart blocks for certain steps involved in and/or between the client 202 and/or the servers 204-208 of FIG. 2.

Multiple computers are queried to identify multiple data streams as scheduled for backup, act 502. For example, the backup optimizer 224 queries the first application server 204, which identifies the database A 214 and the database B 216 as scheduled for backup at midnight, and queries the second application server 206, which identifies the database C 218 and the database D 220 as scheduled for backup at midnight.

Multiple computers are queried to identify multiple backup time estimates corresponding to multiple data streams, act 504. For example, the backup optimizer 224 queries the first application server 204, which identifies a 400 gigabyte data stream A for the database A 214 and a 200 gigabyte data stream B for the database B 216, and queries the second application server 206, which identifies a 100 gigabyte data stream C for the database C 218 and a 300 gigabyte data stream D for the database D 220.

A ranked relational sequence is created based on multiple backup time estimates, act 506. For example, the backup optimizer 224 creates a ranked relational sequence of the 400 gigabyte data stream A for the database A 214, the 300 gigabyte data stream D for the database D 220, the 200 gigabyte data stream B for the database B 216, and the 100 gigabyte data stream C for the database C 218.

Multiple computers are instructed to provide multiple data streams based on a ranked relational sequence, act 508. For example, the backup optimizer 224 instructs the first application server 204 to provide the 400 gigabyte data stream A for the database A 214 first in the sequence of data streams, the second application server 206 to provide the 300 gigabyte data stream D for the database D 220 second in the sequence of data streams, the first application server 204 to provide the 200 gigabyte data stream B for the database B 216 third in the sequence of data streams, and the second application server 206 to provide the 100 gigabyte data stream C for the database C 218 fourth in the sequence of data streams.

Multiple data streams are concurrently backed up based on a concurrency limit and a ranked relational sequence, act 510. For example, the backup application 222 begins backing up the 400 gigabyte data stream A for the database A 214 and the 300 gigabyte data stream D for the database D 220 because the system 200, the backup server 208 and/or the backup application 222 has a backup concurrency limit of two data streams. The backup application 222 begins with the data streams for the databases A and D 214 and 220 because the backup application 222 received the 400 gigabyte data stream A for the database A 214 first in the sequence of data streams and received the 300 gigabyte data stream D for the database D 220 second in the sequence of data streams. When the backup application 222 finishes backing up the 300 gigabyte data stream D for the database D 220, the backup application 222 begins backing up the 200 gigabyte data stream B for the database B 216 because the backup application 222 received the 200 gigabyte data stream B for the database B 216 third in the sequence of data streams. When the backup application 222 finishes backing up the 400 gigabyte data stream A for the database A 214, the backup application 222 begins backing up the 100 gigabyte data stream C for the database C 218 because the backup application 222 received the 100 gigabyte data stream C for the database C 218 fourth in the sequence of data streams.

Although FIG. 5 depicts the acts 502-510 occurring in a specific order, the acts 502-510 may occur in another order. Executing the flowchart 500 enables concurrently backing up data streams of multiple computers based on backup time estimates. By enabling the concurrent backing up of data streams of multiple computers based on backup time estimates, the backup optimizer 224 reduces the total amount of time required to back up data streams. Descriptions above of FIG. 3 and FIG. 4 indicate that the backup optimizer 224 reduces the amount of time required to back up the data streams by 16.6% in this example.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for concurrently backing up data streams of multiple computers based on backup time estimates, the system comprising:
    a processor-based application executed on a computer and configured to:
        query a plurality of computers to identify a plurality of data streams scheduled for backup;
        query the plurality of computers to identify a plurality of backup time estimates corresponding to the plurality of data streams, wherein the plurality of backup time estimates are based on corresponding sizes of the plurality of data streams;
        create a ranked relational sequence based on the plurality of backup time estimates, the ranked relational sequence including a backup position for each data stream of the plurality of data streams;
        transmit instructions to each of the plurality of computers to provide the plurality of data streams to a backup application according to the backup position of each of the data streams in the created ranked relational sequence;
        receive the plurality of data streams from the plurality of computers in accordance with the backup position of each of the data streams in the created ranked relational sequence;
        initiate concurrent back ups of at least two sequential data streams of the plurality of data streams, the sequential order being in accordance with the backup positions of the data streams in the created ranked relational sequence; and
        initiate a backup of a next sequential data stream of the plurality of data streams in response to the completion of the back up of one of the at least two plurality of data streams, the next sequential data stream being the next data stream in the created ranked relational sequence, such that the number of data streams being backed up is limited by a concurrency limit.

2. The system of claim 1, wherein the plurality of data streams correspond to a plurality of at least one of operating systems, application programs, disk drives, directories, and files.

3. The system of claim 1, wherein the plurality of backup time estimates are further based on corresponding historical backup times of the plurality of data streams.

4. The system of claim 3, wherein the corresponding historical backup times of the plurality of data streams are normalized based on corresponding historical sizes of the plurality of data streams relative to corresponding current sizes of the plurality of data streams.

5. The system of claim 1, wherein the ranked relational sequence is based on a decreasing order from a longest time estimate to a shortest time estimate.

6. The system of claim 1, wherein the ranked relational sequence is based on an increasing order from a shortest time estimate to a longest time estimate.

7. A computer-implemented method for concurrently backing up data streams of multiple computers based on backup time estimates, the method comprising:
    querying a plurality of computers to identify a plurality of data streams scheduled for backup;
    querying the plurality of computers to identify a plurality of backup time estimates corresponding to the plurality of data streams, wherein the plurality of backup time estimates are based on corresponding sizes of the plurality of data streams;
    creating a ranked relational sequence based on the plurality of backup time estimates, the ranked relational sequence including a backup position for each data stream of the plurality of data streams;
    transmitting instructions to each of the plurality of computers to provide the plurality of data streams to a backup application according to the backup position of each of the data streams in the created ranked relational sequence;
    receiving the plurality of data streams from the plurality of computers in accordance with the backup position of each of the data streams in the created ranked relational sequence;
    initiating concurrent back ups of at least two sequential data streams of the plurality of data streams, the sequential order being in accordance with the backup positions of the data streams in the created ranked relational sequence; and
    initiating a backup of a next sequential data stream of the plurality of data streams in response to the completion of the back up of one of the at least two plurality of data streams, the next sequential data stream being the next data stream in the created ranked relational sequence, such that the number of data streams being backed up is limited by a concurrency limit.

8. The method of claim 7, wherein the plurality of data streams correspond to a plurality of at least one of operating systems, application programs, disk drives, directories, and files.

9. The method of claim 7, wherein the plurality of backup time estimates are further based on corresponding historical backup times of the plurality of data streams.

10. The method of claim 9, wherein the corresponding historical backup times of the plurality of data streams are normalized based on corresponding historical sizes of the plurality of data streams relative to corresponding current sizes of the plurality of data streams.

11. The method of claim 7, wherein the ranked relational sequence is based on a decreasing order from a longest time estimate to a shortest time estimate.

12. The method of claim 7, wherein the ranked relational sequence is based on an increasing order from a shortest time estimate to a longest time estimate.

13. A computer program product, comprising a non-transitory computer-readable medium having a computer-readable program code embodied therein to be executed by one or more processors, the program code including instructions to:

query a plurality of computers to identify a plurality of data streams scheduled for backup;

query the plurality of computers to identify a plurality of backup time estimates corresponding to the plurality of data streams, wherein the plurality of backup time estimates are based on corresponding sizes of the plurality of data streams;

create a ranked relational sequence based on the plurality of backup time estimates, the ranked relational sequence including a backup position for each data stream of the plurality of data streams;

transmit instructions to each of the plurality of computers to provide the plurality of data streams to a backup application according to the backup position of each of the data streams in the created ranked relational sequence;

receive the plurality of data streams from the plurality of computers in accordance with the backup position of each of the data streams in the created ranked relational sequence;

initiate concurrent back ups of at least two sequential data streams of the plurality of data streams, the sequential order being in accordance with the backup positions of the data streams in the created ranked relational sequence; and initiate a backup of a next sequential data stream of the plurality of data streams in response to the completion of the back up of one of the at least two plurality of data streams, the next sequential data stream being the next data stream in the created ranked relational sequence, such that the number of data streams being backed up is limited by a concurrency limit.

14. The computer program product of claim 13, wherein the plurality of data streams correspond to a plurality of at least one of operating systems, application programs, disk drives, directories, and files.

15. The computer program product of claim 13, wherein the plurality of backup time estimates are further based on corresponding historical backup times of the plurality of data streams.

16. The computer program product of claim 15, wherein the corresponding historical backup times of the plurality of data streams are normalized based on corresponding historical sizes of the plurality of data streams relative to corresponding current sizes of the plurality of data streams.

17. The computer program product of claim 13, wherein the ranked relational sequence is based on one of a decreasing order from a longest time estimate to a shortest time estimate and an increasing order from a shortest time estimate to a longest time estimate.

* * * * *